United States Patent
Okubo et al.

(10) Patent No.: US 7,906,880 B2
(45) Date of Patent: Mar. 15, 2011

(54) BRUSHLESS MOTOR WITH SKEWED ROTOR SEGMENTS

(75) Inventors: Masayuki Okubo, Kiryu (JP); Mikio Kawamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 135 days.

(21) Appl. No.: 12/379,861

(22) Filed: Mar. 3, 2009

(65) Prior Publication Data

US 2009/0224621 A1   Sep. 10, 2009

(30) Foreign Application Priority Data

Mar. 5, 2008   (JP) .................................. 2008-054772

(51) Int. Cl.
    *H02K 1/27* (2006.01)
(52) U.S. Cl. ........ 310/156.25; 310/156.47; 310/216.041
(58) Field of Classification Search ............. 310/156.25, 310/156.36, 156.37, 156.47, 156.38, 156.45, 310/156.53, 216.008, 216.011, 216.041, 310/216.045, 216.046, 216.047, 216.048
    See application file for complete search history.

(56) References Cited

U.S. PATENT DOCUMENTS

| 5,355,044 | A | * | 10/1994 | Uchida et al. ................. 310/162 |
| 6,034,459 | A | * | 3/2000 | Matsunobu et al. ..... 310/156.38 |
| 6,104,117 | A | * | 8/2000 | Nakamura et al. ..... 310/216.074 |
| 6,252,323 | B1 | * | 6/2001 | Nishikawa et al. ...... 310/156.01 |
| 6,462,452 | B2 | * | 10/2002 | Nakano et al. ........... 310/156.47 |
| 6,867,524 | B2 | * | 3/2005 | Liang ....................... 310/156.47 |
| 2005/0023919 | A1 | * | 2/2005 | Nakano et al. ........... 310/156.47 |
| 2005/0121990 | A1 | * | 6/2005 | Kaneko ..................... 310/156.47 |

FOREIGN PATENT DOCUMENTS

| JP | 08-251847 | 9/1996 |
| JP | 2003-339129 | 11/2003 |
| JP | 2004-159492 | 6/2004 |
| JP | 2006-042414 | 2/2006 |

* cited by examiner

*Primary Examiner* — Quyen Leung
*Assistant Examiner* — Naishadh N Desai
(74) *Attorney, Agent, or Firm* — Wenderoth, Lind & Ponack, L.L.P.

(57) ABSTRACT

In a brushless motor including a rotor having $2n$ poles and a stator having $3n$ slots, segment magnets are arranged in three columns in the axial direction, thus constituting rotor poles. The segment magnets of adjacent columns, which are identical in polarity, are displaced in the circumferential direction, thus forming a three-stage step-skew structure. The skew angle θskew of each segment magnet is set to an electrical angle of 60° to 75°. The center angle of θm of each segment magnet is set to 46.8° to 52.7°.

3 Claims, 7 Drawing Sheets

| | θ | |
|---|---|---|
| | MIN | MAX |
| 2P3S | 140.0 | 159.0 |
| 4P6S | 70.0 | 79.5 |
| 6P9S | 46.7 | 53.0 |
| 8P12S | 35.0 | 39.8 |
| 10P15S | 28.0 | 31.8 |

Unit: Degree in mechanical angle

BRUSHLESS MOTOR WITH SKEWED ROTOR SEGMENTS

BACKGROUND OF THE INVENTION

1. Field of the Invention

The present invention relates to a brushless motor that has a skew structure. More particularly, the invention relates to a brushless motor having a step-skew structure by means of segment magnets.

2. Related Art Statement

Hitherto known, as means for reducing cogging torque and torque ripple, is the skew structure in which the rotor poles or the like are inclined to the axis direction. In most brushless motors of skew structure, ring magnets are used as pole magnets. In any motor using ring magnets, the magnets are skew-magnetized in order to reduce cogging torque and torque ripple.

In brushless motors designed for use in electric power steering apparatuses, the segment magnets that can be magnetized at high flux density are increasingly used as rotor magnets, thereby to meet the demand that the motors should be smaller and should yet achieve a large output. However, the segment magnets (right-angled magnetic field type magnets) cannot be skew-magnetized due to the restriction imposed on their manufacture. In any motor that has segment magnets, the segment magnets are therefore stacked one on another, thus achieving a so-called step skew in order to perform skew structure.

In the motor of step-skew structure, the segment magnets are arranged in even-number stages (usually, two stages), in the axial direction in order to offset the cogging waves at the respective steps to reduce the cogging torque. Patent Document 1 discloses a rotating electrical machine in which magnets are arranged in two stages. In the rotating electrical machine disclosed in the patent, the magnets of each stage are arranged in the circumferential direction, each magnet being shifted at a specific angle from the next. The poles of the rotor are thereby displaced stepwise in the axial direction, whereby a two-staged, step-skew structure is constructed.

In the step-skew structure, however, assembled state, physical properties, process precision, and the like actually have a variation from the design specification. Inevitably, the cogging torque cannot be reduced so much in the two-staged, step-skew structure. The cogging torque can be hardly be reduced, particularly in any motor that has a few poles and a few slots because the least common multiple of the number of poles and the number of slots is small, inevitably increasing the influence of the variation. In view of this, the accuracy of the magnets and parts assembling are very strict, and the motor cannot be as robust as desired.

A six-pole, nine-slot motor, for example, exhibits a ninth-order cogging waveform (for every rotation) because of the variation in terms of rotor manufacture precision, and exhibits sixth-order cogging waveform (for every rotation) because of the stator variation. The fundamental cogging waveform is therefore the 18th-order waveform (that is, the least common multiple of 9 and 6). The cogging waveform attributable to the assembly unbalance is an even-number times each order of the cogging waveform. As a result, an integral multiple of each order will be added to the cogging. Particularly, the variation of the rotor in manufacture precision caused by the stepped structure greatly contributes to the cogging. If the 36th-order component of cogging waveform caused by the stepped structure variation becomes prominent, the cogging cannot be reduced even at the logical skew angle (360°/the least common multiple of poles and slots).

In order to reduce both the cogging and the torque ripple, when the magnets must have a large width and a large skew angle to reduce the harmonic components of the induced voltage, any two adjacent poles (different in polarity) of each stage may overlap each other. In case the magnets having different polarity overlap each other, the magnetic fluxes will be cut short. As a result, effective fluxes required for driving the motor will not be provided. Consequently, the skew angle will not be increased, and so the cogging torque and the like cannot be reduced enough, and the effective fluxes decrease to result in a small motor output.

SUMMARY OF THE INVENTION

An object of the present invention is to provide a brushless motor that excels in robustness against the variations of assembly precision and skew angle, and that can therefore produce a larger output than the conventional motors having rotor-skew structure using a ring magnet.

A brushless motor according to this invention includes a rotor having 2n magnetic poles (n being a positive integer) arranged in a circumferential direction, and a stator having 3n slots. The magnetic poles of the rotor are composed of segment magnets arranged in three columns extending in an axial direction. The magnets of each column are displaced from the magnet of either adjacent column in the circumferential direction, thus forming a step-skew structure. The segment magnets have a skew angle θskew ranging from 60° to 75° in terms of electrical angle.

A motor of the 2P3S-n structure, according to this invention, may have a three-stage skew structure and a skew angle of 60° to 75° in terms of electrical angle. The few poles and few slots brushless motor can then generate a larger output than any rotor-skew motor, while suppressing cogging torque and torque ripples.

In the brushless motor, each of the segment magnets has a center angle θm expressed as $(140 \times n^{-1})° \leq \theta m \leq (159 \times n^{-1})°$. The magnets of each column are thereby arranged, not overlapping the magnets of any adjacent column in the circumferential direction, preventing magnetic fluxes from being short cut. This prevents the motor output from decreasing caused by the decrease of magnetic fluxes. Since the brushless motor achieves low cogging torque, low torque ripple and a large output in good balance, it is fit for use as a drive source in electric power steering apparatuses. If used in an electric power steering apparatus, the brushless motor can serve to make the electric power steering apparatus small and light without degrading steering feeling.

DESCRIPTION OF THE PREFERRED EMBODIMENT

Figure 1:
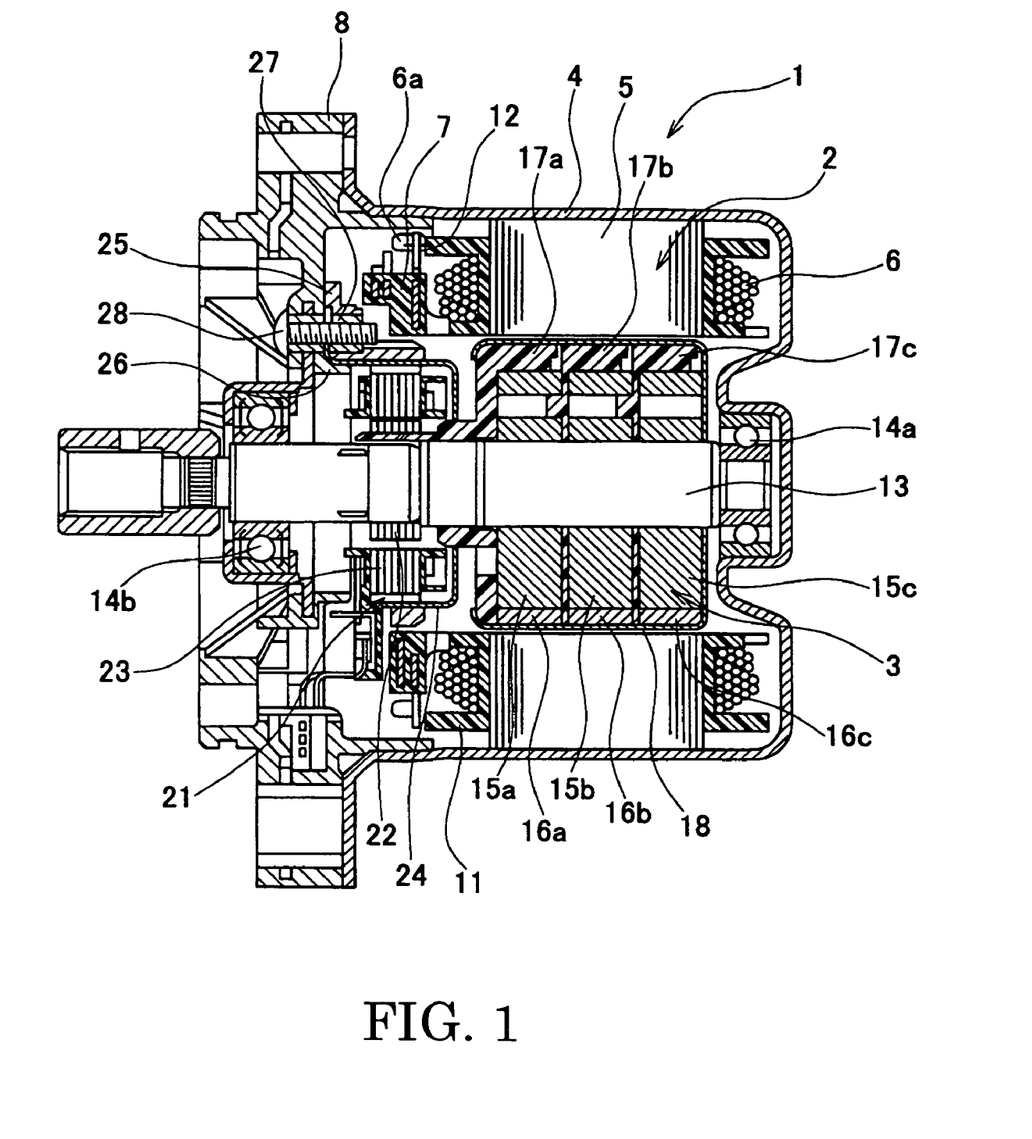
FIG. 1 is a sectional view of a brushless motor according to an embodiment of the present invention.

An embodiment of the present invention will be described in detail, with reference to the accompanying drawings. FIG. 1 is a sectional view of a brushless motor according to an embodiment of the present invention. As shown in FIG. 1, the brushless motor 1 (hereinafter referred to as "motor 1") is an inner-rotor type that has a stator 2 and a rotor 3 arranged in the stator 2. For example, the motor 1 may be used as the power source of an electric power-steering (EPS) apparatus of column-assist type. The motor 1 can apply an auxiliary drive force to the steering shaft. The motor 1 is secured to a speed-reducing mechanism, which is in turn coupled to the steering shaft. The speed-reducing mechanism reduces the rotational speed of the motor 1 and transmits the rotation to the steering shaft.

The stator 2 includes a case 4, a stator core 5, stator coils 6, and a bus-bar unit (terminal unit) 7. The stator coils 6 (hereinafter called "coils 6") are wound around the stator core 5. The bus-bar unit 7 is attached to the stator core 5. The case 4 is a bottomed hollow cylinder made of iron or the like. The case 4 has openings. In the openings, brackets 8 made of die-cast aluminum are fitted. The brackets 8 are secured to the case 4 with fastening screws (not shown).

Figure 2:
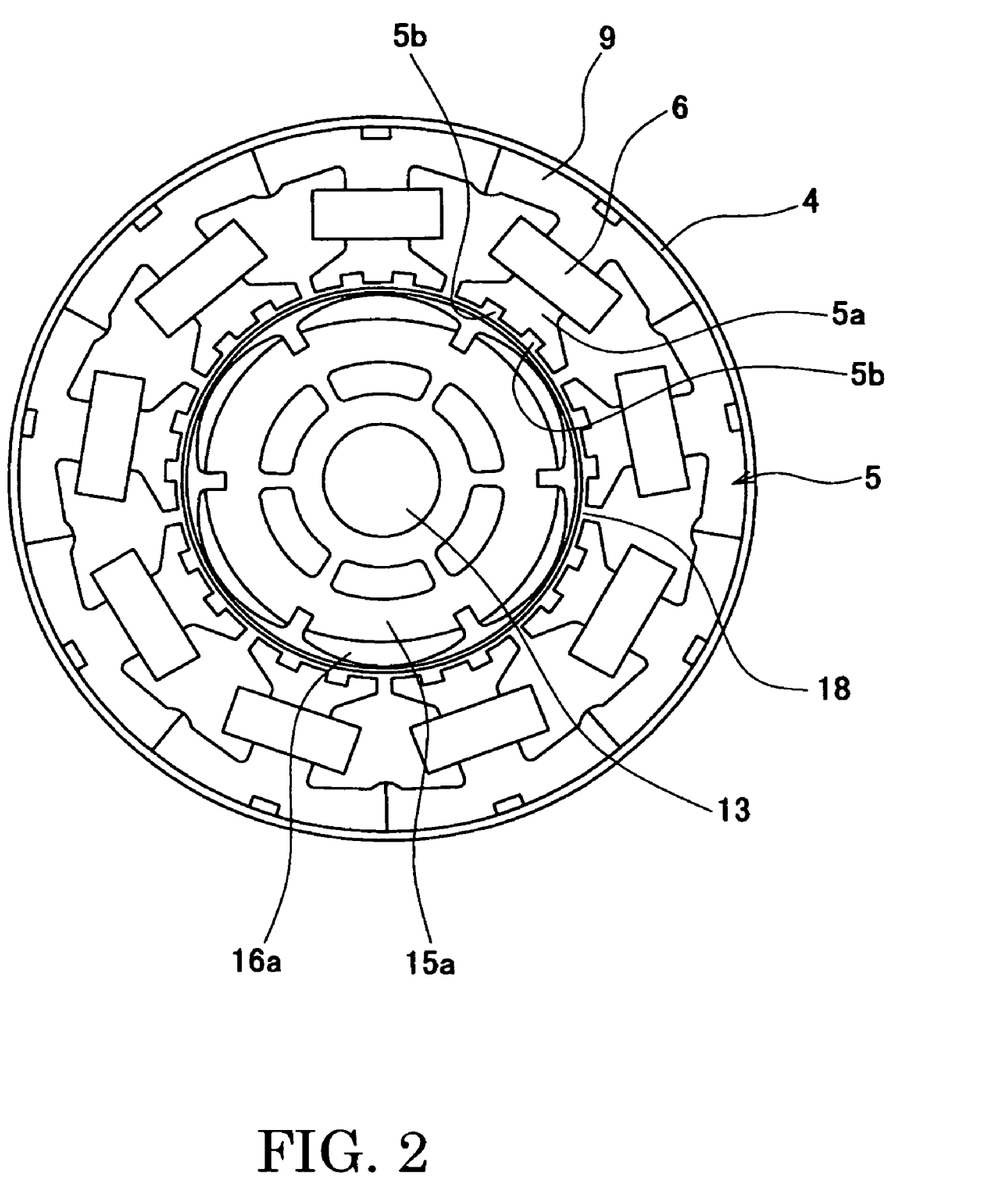
FIG. 2 is a diagram explaining the configuration of the stator of the motor of FIG. 1.

As shown in FIG. 2, the stator core 5 is composed of core segments 9 (nine segments, in this embodiment) that are arranged in the circumferential direction. The stator core 5 has nine teeth 5a that project inside (inwardly) in the radial direction. The distal end of each core segment 9 of the stator core 5 has 2n grooves 5b (two grooves, in this embodiment). The grooves 5b are designed to reduce cogging torque resulting from pseudo slot effect. Each core segment 9 has been produced by stacking core pieces (i.e., electromagnetic steel plates). An insulator 11 made of synthetic resin surrounds the core segments 9.

The coils 6 are wound around the insulator 11. One end part 6a of each coil 6 is lead at the one end of the stator core 5. The bus-bar unit 7 is secured to the one end of the stator core 5. Bus bars made of copper are inserted in the casing of the bus-bar unit 7 that is made of synthetic resin. From the circumferential surface of the bus-bar unit 7, a plurality of power supply terminals 12 protrude in the radial direction. The end part 6a of each coil 6 has been welded to the power supply terminals 12 at the time of fastening the bus-bar unit 7. The bus-bar unit 7 has as many bus bars as the number of phases of the motor 1 (in this embodiment, three bus bars are provided for U, V and W phases, respectively). Each coil 6 is electrically connected to the power supply terminal 12 for the associated phase. The stator core 5 has been press-fitted and fixed in the case 4 after the bus-bar unit 7 had been fastened.

Figure 3:
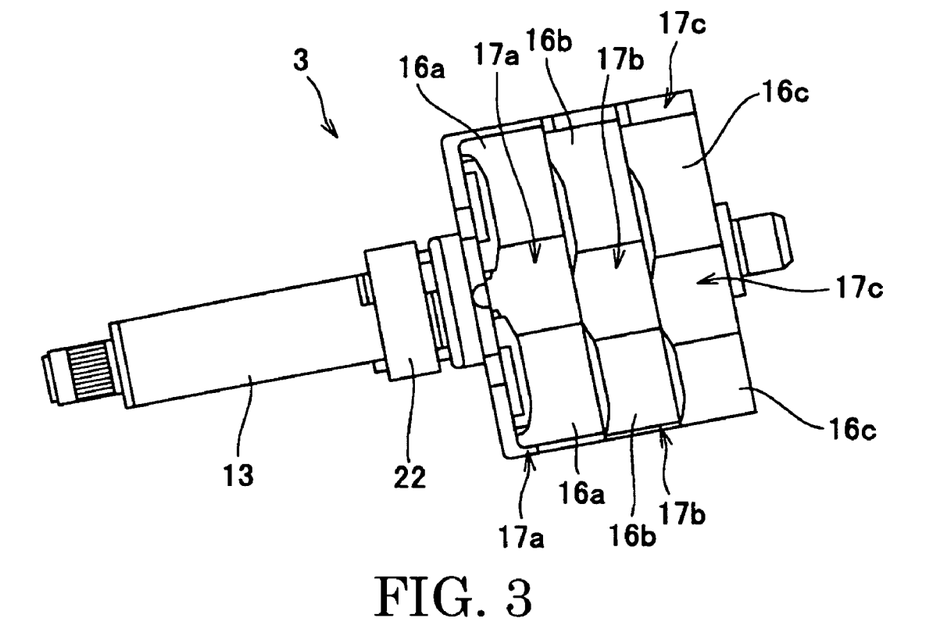
FIG. 3 is a diagram explaining the configuration of the rotor of the motor of FIG. 1.
Figure 4:
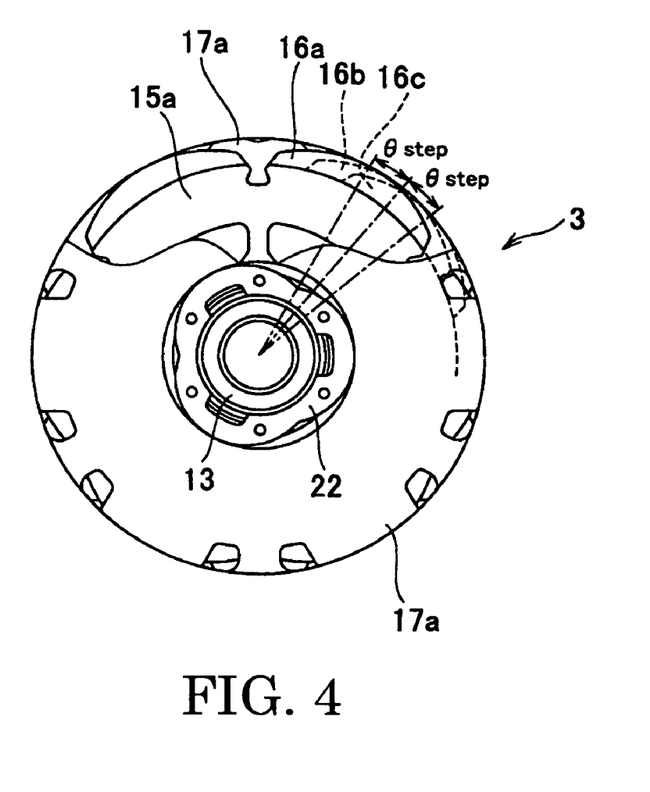
FIG. 4 is a side view (partly sectional) of the rotor, as viewed in the direction of arrow X in FIG. 3.

The rotor 3 is inserted in the stator 2. FIG. 3 is a diagram explaining the configuration of the rotor 3. FIG. 4 is a side view (partly sectional) of the rotor, as viewed in the direction of arrow X in FIG. 3. The rotor 3 has a rotor shaft 13. The rotor shaft 13 can freely rotate, supported by bearings 14a and 14b. The bearings 14a and 14b are fastened to the center part of the bottom of the case 4 and the center part of the bracket 8, respectively. On the rotor shaft 13, a hollow cylindrical rotor core 15 (15a to 15c) is secured. To the outer circumferential surfaces of the rotor cores 15a to 15c, a segment-type magnet (permanent magnet) 16 (16a to 16c) is fastened. In the motor 1, magnets 16a to 16c are arranged in six rows and three columns along the circumferential direction. That is, the motor 1 has a six-pole, nine-slot structure (hereinafter referred to as "6P9S"). A magnet cover 18, which is a bottomed hollow cylinder, is provided, surrounding the magnets 16a to 16c. Note that FIG. 3 shows the rotor 3 from which the magnet cover 18 has been removed.

Magnet holders 17a to 17c made of synthetic resin are secured to the outer sides of the magnets 16a to 16c. As shown in FIG. 4, the magnets 16a to 16c are held by the magnet holders 17a to 17c. The magnet holders 17a to 17c are attached to the outer circumferences of the rotor cores 15a to 15c. In the motor 1, the magnets 16a to 16c, i.e., three columns of magnets, are arranged in the axial direction, while held by the magnet holders 17a to 17c. As FIG. 3 shows, the magnets 16a to 16c of each column are displaced from the magnets of any adjacent column having the same polarity in the circumferential direction by a predetermined step angle θstep (the angle between centers of adjacent column magnets). Thus, the rotor 3 of the motor 1 has a step-skew structure, in which the three magnets 16a to 16c of each column are stacked one on another.

Figure 5:
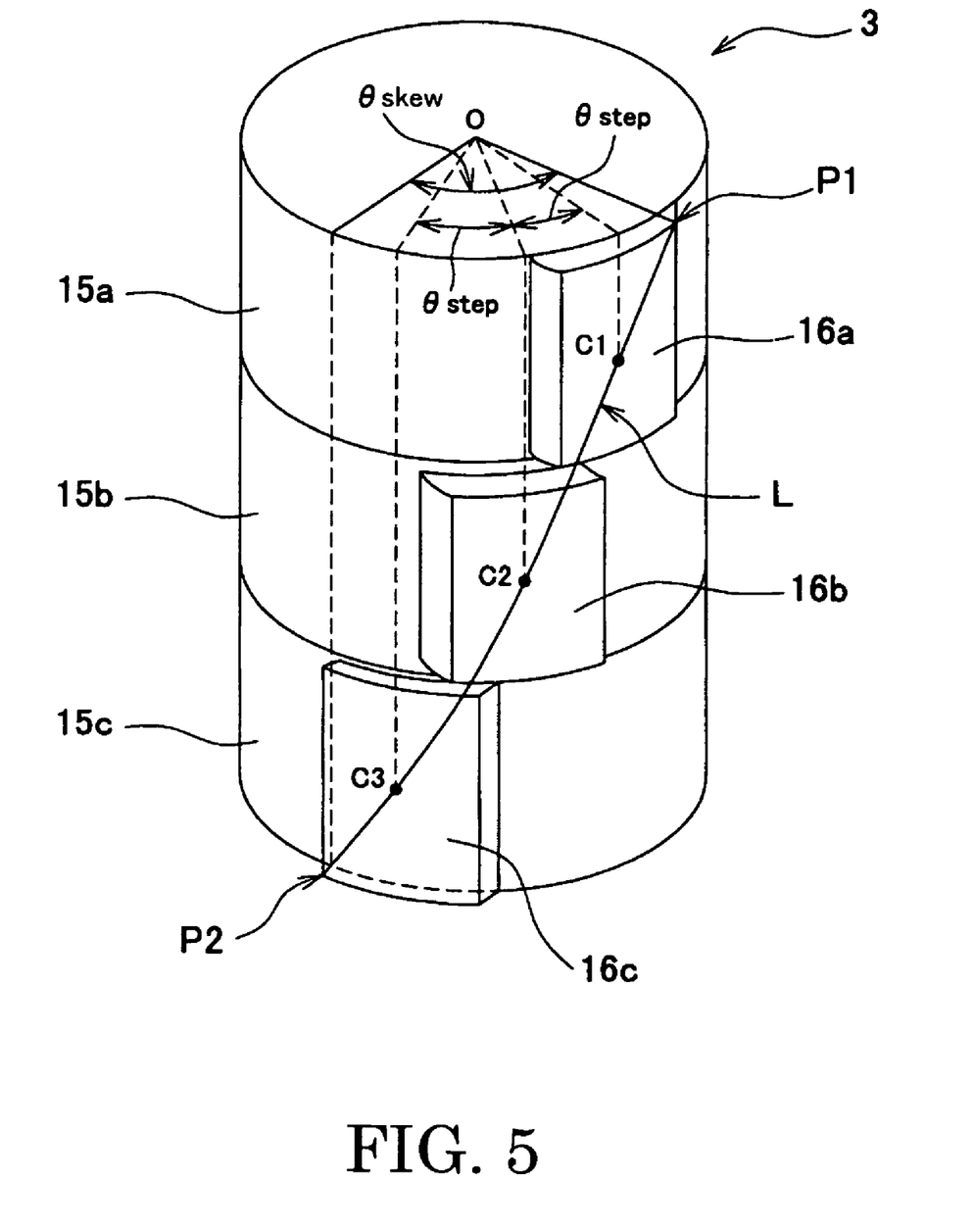
FIG. 5 is a diagram explaining the skew angle the rotor has.

FIG. 5 is a diagram explaining the skew angle of the rotor 3. As shown in FIG. 5, in the step-skew structure, the line L connecting the centers C1 to C3 of the magnets 16a to 16c (in both the circumferential direction and the axial direction) intersects with the outer ends of the magnets 16a and 16c at points P1 and P2, respectively. The center angle to the center O of rotation between the points P1 and P2 is the magnet skew angle. Hence, the step angle θstep between the magnets 16a and 16b is a center angle between the points C1 and C2 to the center O of rotation, and the step angle θstep between the magnets 16b and 16c is a center angle between the points C2 and C3 to the center O of rotation. The center angles between the points C1 and P1, C3 and P2 are half the step angle θstep (i.e., θstep/2) respectively. Therefore, the skew angle θskew is θstep×(number of magnets stacked−1)+(θstep/2)×2=θstep×number of magnets stacked.

A rotor 22 (resolver rotor) of a resolver 21 used as means for detecting a rotation angle is attached to the end of the magnet holder 17a. By contrast, the stator 23 (resolver stator) of the resolver 21 is pressed into a resolver holder 24 made of metal and held in a resolver bracket 25 made of synthetic resin. The resolver holder 24 is a bottomed hollow cylinder. The resolver holder 24 is press fitted lightly on the outer circumferential surface of a rib 26, which is provided on the center part of the bracket 8. A female screw 27 made of metal is inserted in the resolver bracket 25 and bracket 8. A holding screw 28 is screwed in the female screw 27 from the outside the bracket 8. The resolver 24 is thereby secured in the bracket 8.

In the motor 1 (6P9S) according to the invention, the skew angle θskew=step angle θstep×number of stages (number of magnets stacked−1) is 20° to 25° (mechanical angle; 60° to 75° in terms of or electrical angle). As described above, the theoretical skew angle at which cogging torque is zero is 360°/the common least multiple of the poles and slots in any 6P9S-structure motor. In the case of the motor 1, 360°/

Figure 6:
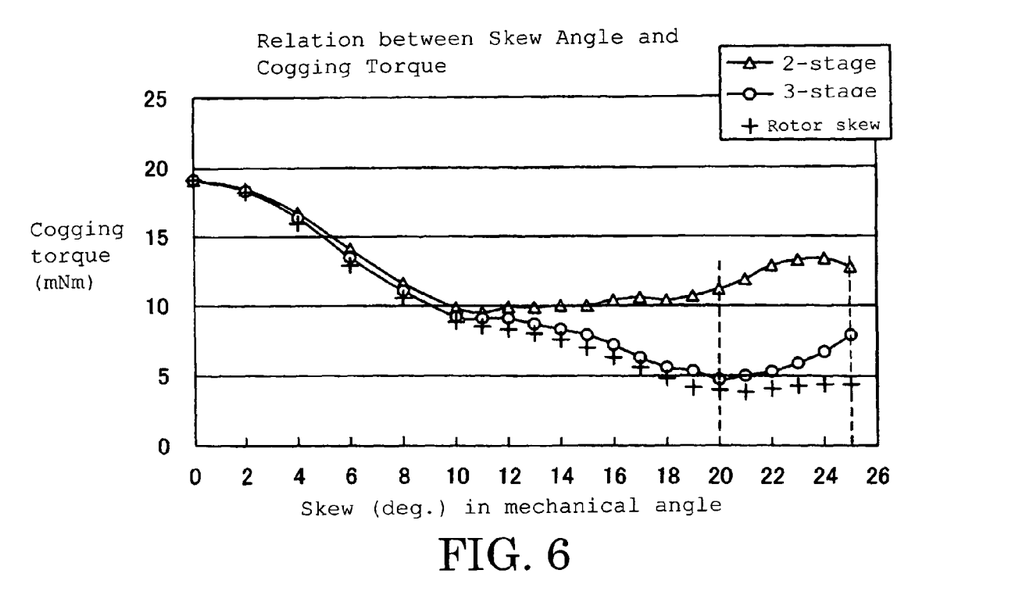
FIG. 6 is a diagram representing the relation between the skew angle and the fifth harmonic component of an induced voltage.

18=20°. FIG. 6 is a diagram representing the relation between the skew angle and the cogging torque. As seen from FIG. 6, the cogging torque is less prominent for the three-stage step skew (hereinafter called "3-stage skew") than for the two-stage step skew (hereinafter called "2-stage skew"). The cogging torque for the 3-stage skew is greatly suppressed to almost the same value as the rotor skew. The cogging torque has a minimum value at the skew angle of 20°, and it is 20% at most from the minimum value in a skew-angle range of about 17° to 24°.

Figure 7:
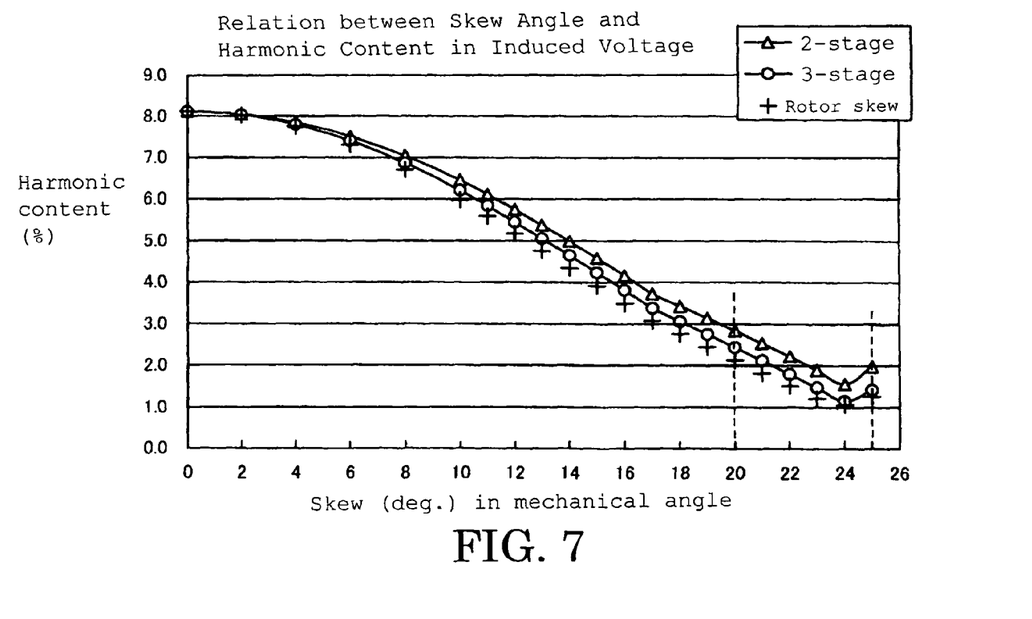
FIG. 7 is a diagram representing the relation between the skew angle and a harmonic component of an induced voltage.

In the motor of 6P9S structure, the harmonic components (chiefly the fifth) in the induced voltage, which influence the torque ripple, are the smallest at the theoretical skew angle of 24°. FIG. 7 is a diagram that represents the relation between the skew angle and the fifth harmonic component of the induced voltage. As evident from FIG. 7, the fifth harmonic component of the induced voltage is generally larger for the 3-stage skew than for the 2-stage skew, and the torque ripple can be suppressed to almost the same extent as the rotor skew.

Figure 8:
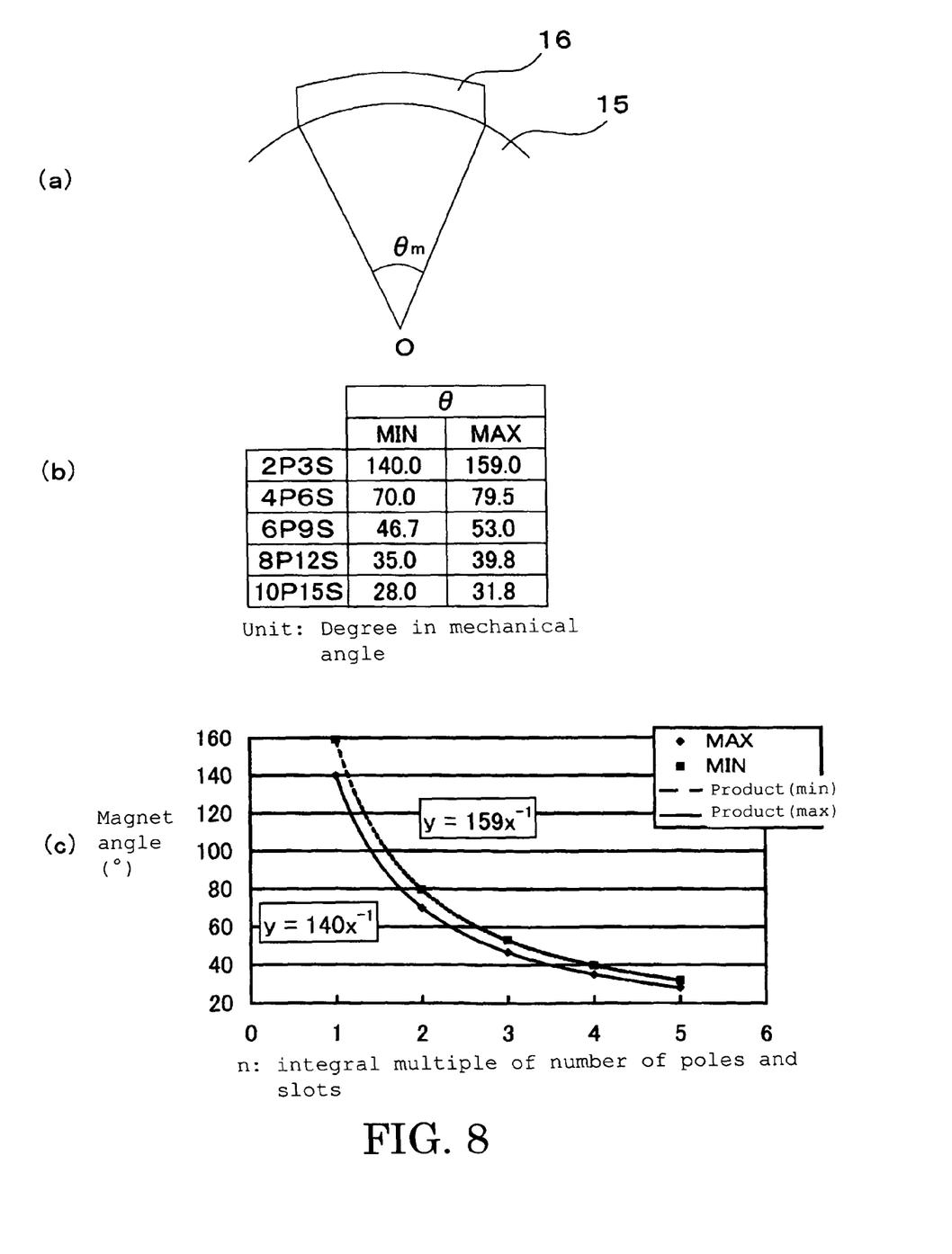
FIG. 8A is a diagram illustrating the center angle θm of the magnets.
FIG. 8B is a table showing various conditions for preventing three columns of magnets from overlapping in a motor of a 2P3S×n structure.
FIG. 8C is a graph representing the relation between the number of pole, the multiple n of slot number, and the maximal and minimal values for the magnet angle under the conditions shown in FIG. 8B.

By contrast, in the motor 1, the magnets 16a to 16c of each column are arranged not to overlap in the circumferential direction if the magnets 16a to 16c have the above-specified skew angle (step angle). FIG. 8A is a diagram that illustrates the center angle θm of the magnets 16a to 16c (i.e., center angle of the magnet circumferential length (magnet width) with respect to the center O of rotation). FIG. 8B is a table showing various conditions for preventing three columns of magnets from overlapping in a motor of 2P3S×n structure. As may be understood from FIG. 8B, the center angle θm must fall within the range of 46.7° to 53.0° in the motor 1 of 6P9S structure. As seen from FIG. 8C, $(140 \times n^{-1})° \leq \theta m \leq (159 \times n^{-1})°$ in most motors of 2P3S×n structure.

Figure 9:
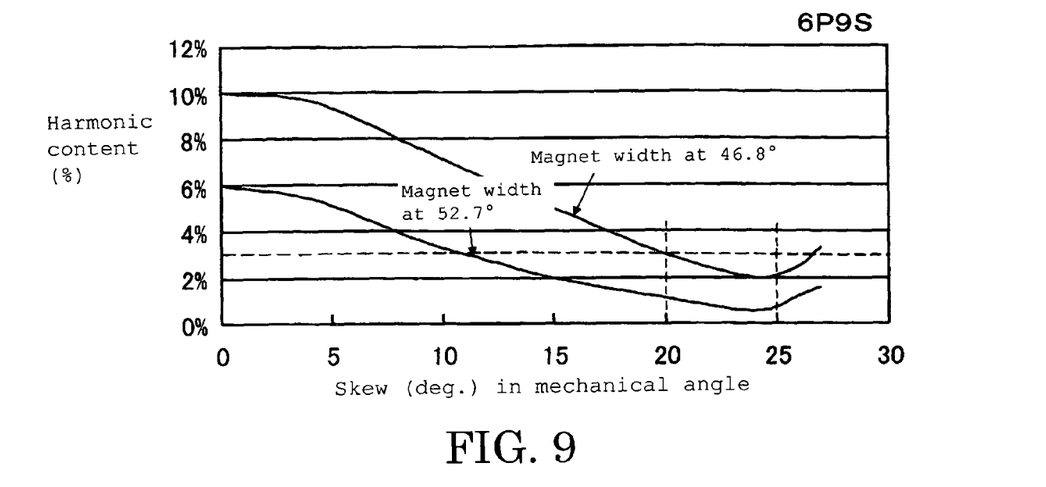
FIG. 9 is a diagram showing the relation between the skew angle and the content of the fifth harmonic component of an induced voltage.

The inventors hereof studied the relationship that the skew angle of the magnets 16a to 16c and the fifth harmonic component of induced voltage had at this value setting. FIG. 9 is a diagram showing the relationship between the skew angle and the fifth harmonic component. The experiment the inventors conducted shows that the content of the fifth harmonic component is higher when the magnet center angle θm is 46.7° than when the angle θm was 53.0°. As seen from FIG. 9, the skew angle ranges from about 20° to about 27° in the region where the content of harmonic components can be suppressed to 3% or less considering the influence on the torque ripple. If the skew angle is 25° or more, however, the content of harmonic components will abruptly increase.

From the foregoing, in the 3-stage skew, the skew angle should preferably fall in the following ranges:
(1) Range of 17° to 24° (FIG. 6), in which the optimal skew angle is 20° in view of the relation with the cogging torque.
(2) Range of 20° to 25° (FIG. 7), in which the optimal skew angle is 24° in view of the relation with the torque ripple.
(3) Range of 20° to 25° (FIG. 9) in view of the mutual overlapping of the magnets.

Considering these ranges, the inventors selected a skew angle (θskew) range of 20° to 25° in terms of mechanical angle (i.e., 60° to 75° in terms of electrical angle) as the best range in which the conditions are balanced. Therefore, the step angle θstep is set in the range of 10° to 12.5° in terms of mechanical angle (i.e., 30° to 37.5° in terms of electrical angle) in the motor 1 of three-stage skew structure.

Figure 10:
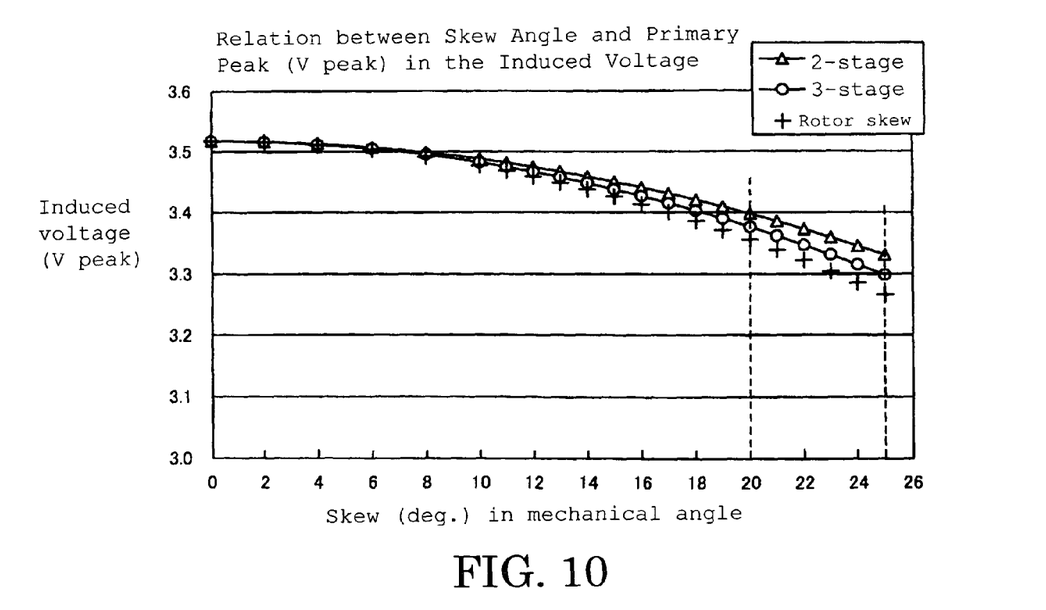
FIG. 10 is a diagram illustrating the relation between the skew angle and the content of the primary harmonic component of induced voltage.

In the 3-stage skew, however, the content of the primary harmonic component of induced voltage, which contributes to the torque, tends to be lower than in the 2-stage skew. FIG. 10 is a diagram illustrating the relation between the skew angle and the primary harmonic component of induced voltage. As seen from FIG. 10, the larger the skew angle, the more the content of the primary harmonic component will decrease and the more the motor torque will decrease, too. The harmonic components of the 3-stage skew motor is smaller than that of the 2-stage skew motor, therefore, the torque of the former is smaller. Nonetheless, as evident from FIG. 10, the 3-stage skew motor can generate a larger output than the rotor skew motor, because the content of harmonic components is higher than in the rotor skew motor.

Thus, the motor 1 according to this invention, in a few poles and a few slots brushless motor, it is possible to generate a larger output than a rotor skew motor, while suppressing cogging torque and torque ripple by adopting the 3-stage skew structure in the 6P9S motor and setting a skew angle (mechanical angle) to 20° to 25°. The motor 1 is a little inferior to a 2-stage skew motor in terms of output, but can reduce cogging torque and torque ripple to the same extent as the rotor skew motor does. Therefore, considering the cogging torque, torque ripple and output, it is possible to satisfy the required specifications in good balance, and to obtain a large-output brushless motor that excels in robustness.

The present invention is not limited to the embodiment described above. Of course, various changes and modifications can be made within the scope and spirit of the invention.

For example, the present invention can be applied to a brushless motor of any other type for use in EPS's, though the embodiment described above is one designed for use in EPS's of column-assist type. In addition, the invention is not limited to motors for use in EPS's and various vehicles. Rather, the invention can be applied to brushless motors of various types. The embodiment described is a 6-pole, 9-slot brushless motor having six magnets. Nevertheless, neither the number of magnets nor the number of slots is limited. In this case, in a motor of integral multiple of 2P3S, a skew angle is set to the range from 60° to 75° (electrical angle).

What is claimed is:

1. A brushless motor comprising:
a rotor having 2n magnetic poles (n being a positive integer) arranged in a circumferential direction; and
a stator having 3n slots, wherein
the magnetic poles of the rotor are composed of segment magnets arranged in three columns extending in an axial direction, each of the columns having segment magnets arranged such that the segment magnets of each column are offset from the segment magnets of either adjacent column in the circumferential direction so as to form a step-skew structure, and
the segment magnets are arranged so that the step-skew structure has a skew angle θskew ranging from 60° to 75° in terms of electrical angle; and
the segment magnets are arranged so that the step-skew structure has a center angle θm expressed as:

$(140 \times n-1)° \leq \theta m \leq (159 \times n-1)°$ such that the segment magnets of each of the columns are arranged not to overlap in the circumferential direction when the segment magnets are arranged to form the step-skew structure having the skew angle θskew.

2. The brushless motor according to claim 1, wherein the brushless motor is designed for use as a drive source in electric power steering apparatuses.

3. The brushless motor according to claim 1, wherein the step-skew structure formed by the segment magnets is such that cogging torque is no more than 20% from the minimum value and such that content of the fifth harmonic component is suppressed to no more than 3%.

* * * * *